US012792734B2

(12) United States Patent
Kordal

(10) Patent No.: US 12,792,734 B2
(45) Date of Patent: Nov. 10, 2026

(54) PROTECTING A COMPUTER STRUCTURE

(71) Applicant: Widdershins Limited, Chelmsford (GB)

(72) Inventor: Michael Kordal, Westcliff-on-Sea (GB)

(73) Assignee: Widdershins Limited, Chelmsford (GB)

( * ) Notice: Subject to any disclaimer, the term of this patent is extended or adjusted under 35 U.S.C. 154(b) by 14 days.

(21) Appl. No.: 18/567,386

(22) PCT Filed: May 30, 2022

(86) PCT No.: PCT/EP2022/064526
§ 371 (c)(1),
(2) Date: Dec. 6, 2023

(87) PCT Pub. No.: WO2022/258409
PCT Pub. Date: Dec. 15, 2022

(65) Prior Publication Data
US 2025/0117487 A1 Apr. 10, 2025

(30) Foreign Application Priority Data
Jun. 8, 2021 (DE) ........................ 102021114687.9

(51) Int. Cl.
*G06F 21/56* (2013.01)
*G06F 21/55* (2013.01)

(52) U.S. Cl.
CPC .......... *G06F 21/567* (2013.01); *G06F 21/556* (2013.01); *G06F 2221/034* (2013.01)

(58) Field of Classification Search
CPC ................ G06F 21/567; G06F 21/556; G06F 2221/034; G06F 21/606
See application file for complete search history.

(56) References Cited

U.S. PATENT DOCUMENTS

| | | | | |
|---|---|---|---|---|
| 8,391,543 | B1 | 3/2013 | Verma | |
| 9,338,143 | B2 * | 5/2016 | Hansen | G06F 21/125 |
| 9,391,832 | B1 | 7/2016 | Song et al. | |
| 11,005,819 | B1 | 5/2021 | Song et al. | |
| 2008/0222736 | A1 * | 9/2008 | Boodaei | G06F 21/128 726/27 |

(Continued)

OTHER PUBLICATIONS

International Preliminary Report on Patentability for PCT Application No. PCT/EP2022/064526, Dated Dec. 21, 2023.

(Continued)

*Primary Examiner* — Michael R Vaughan
(74) *Attorney, Agent, or Firm* — Westborough IP Group, LLC

(57) ABSTRACT

Protecting a computer structure having at least one computer unit against malware or unauthorized data transmission includes connecting the computer structure via a data link to an isolation structure which has at least one processor and a main memory. A data stream containing a sequence of data values is sent or received to or from the computer structure. Data from the data streams is exchanged with the isolation structure, which prevents or at least impedes the transmission of malware to the computer unit or the leaking of data stored on the computer unit. At least one data variation unit uses a random generator to generate deviation values, which are added to the data values of the data stream.

20 Claims, 1 Drawing Sheet

(56) References Cited

U.S. PATENT DOCUMENTS

| | | | | |
|---|---|---|---|---|
| 2014/0283038 A1* | 9/2014 | Call | H04L 63/1441 726/22 |
| 2016/0359871 A1* | 12/2016 | Hansen | H04L 63/0471 |
| 2017/0032120 A1 | 2/2017 | Tolpin et al. | |
| 2018/0278583 A1 | 9/2018 | Cela | |
| 2020/0177623 A1 | 6/2020 | Call et al. | |

OTHER PUBLICATIONS

JPO Office Action dated Apr. 9, 2026, for JP 2023-576945.
German Office Action for Application No. 10 2021 114 687.9, Dated Nov. 9, 2021.
International Search Report for PCT Application No. PCT/EP2022/064526, Dated Aug. 26, 2022.
Commvault, "Greater Ransomware Prevention With Data Isolation & Air Gap Technologies", May 16, 2021, XP055951791 , retrieved from: URL: https://web.archive.org/web/20210516030834/https://www.commvault.com/resources/greater-ransomware-protection-with-dataisolation-and-air-gap-technologies.

* cited by examiner

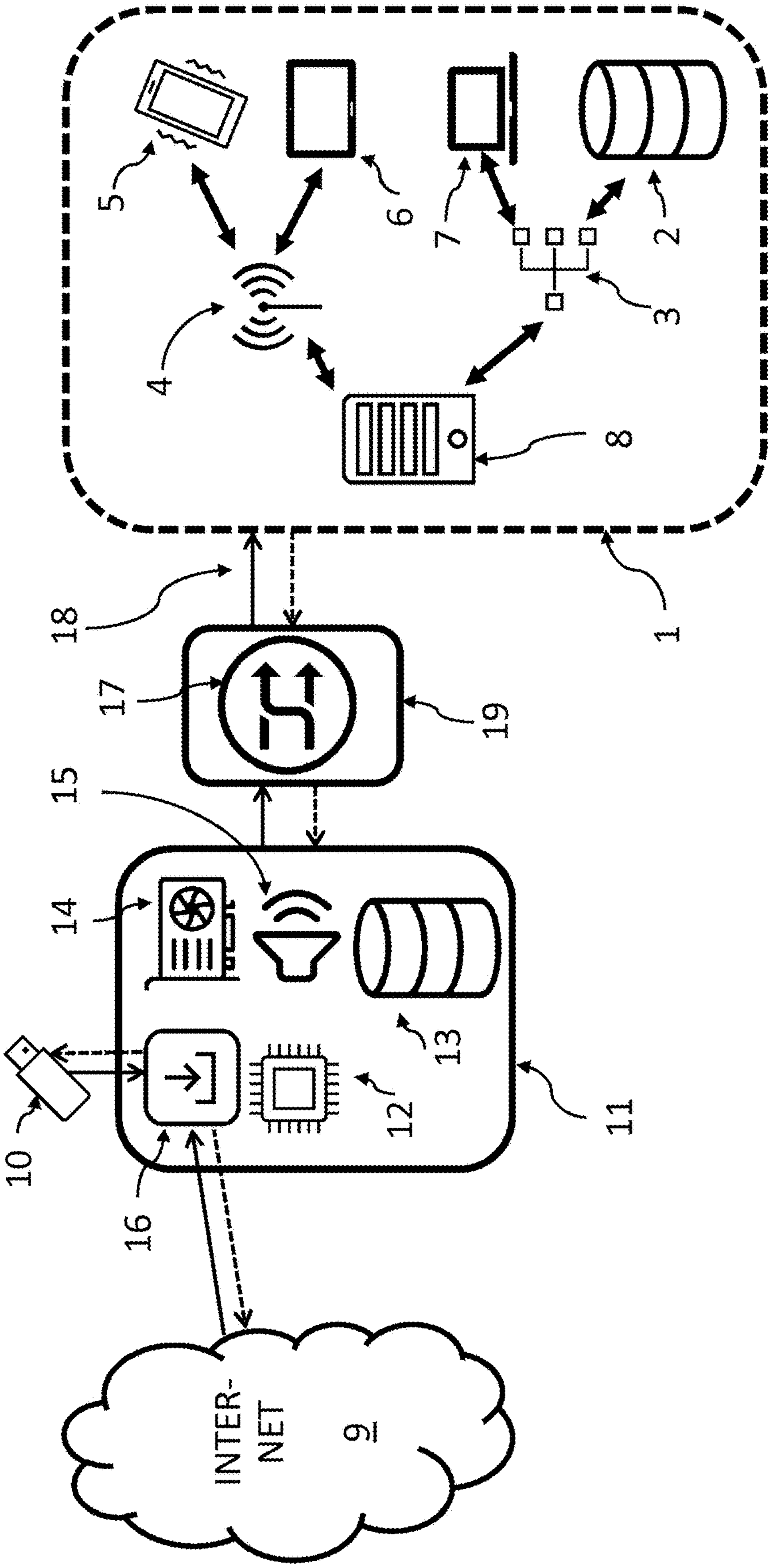
1
2
3
4
5
6
7
8
9
10
11
12
13
14
15
16
17
18
19
INTER-
NET
9

PROTECTING A COMPUTER STRUCTURE

TECHNICAL FIELD

This application relates to protecting a computer structure having at least one computer unit against malware or unauthorized data transmission and more particularly to protecting a computer structure (e.g. a computer network) and computer units integrated into the computer structure against both malware and unauthorized retrieval of stored data (data theft) as well as against spying on internal information such as IT infrastructures.

BACKGROUND

Protecting computer systems against malware is becoming increasingly important. Computer networks in which a large number of users use terminal equipment that access external content via the Internet, intranet or interfaces such as USB ports are particularly susceptible to malware attacks. Such networks are, for example, the computer networks of companies, parliaments, governments or ministries. Confidential data is often stored on various computers in these networks. In addition to the transmission of malware, which can damage the network, there is also a risk that stored confidential data will be read by malware and transmitted to an unauthorized recipient via the Internet, for example.

In practice, the data connection can be used to transmit data packets. A data packet consists of a header and payload. The header can contain information about the source and destination of the packet, for example, but also about the data format of the payload. The payload contains the data values to be transmitted, for example the values for controlling the pixels of screens, for controlling a pointer or for generating an audio signal, e.g., via a sound card. The data connection can be a data bus. However, the data connection can also be a data tunnel in a computer network. Encrypted tunnels can be used to secure data transmission via insecure or untrusted communication connections in a network.

The publication U.S. Pat. No. 9,391,832 B1 proposes allowing a protected computer to access the Internet via a surrogate, where the surrogate transforms/transcodes the received data at least once before the data is transmitted to the protected computer. US 2020 0177623 A1 proposes code modification techniques for detecting abnormal activity. Web code is received and modified web code is generated by changing a specific program element in the entire web code with the aim of detecting abnormalities on a terminal equipment based on the missing program element. The publication US 2017 0032120 A1 describes a system for detecting program variants. The system analyzes system calls by executing a program to generate executable program code. The code is then mutated, improved or modified to generate variations of the program that continue to function like the original code.

SUMMARY OF THE INVENTION

It is desirable to provide a method, program product and system for data exchange between an isolation structure and a computer structure, which prevent or at least impede the transmission of malware to the computer structure or the leaking of data stored in a computer structure and the spying out of internal information of a computer structure.

In the system described herein, at least one data variation unit generates deviation values via a random generator, which are added to the data values of the data stream, where the data values represent at least one of the following contents:

- Image data;
- digital audio signals;
- position data for a pointer.

In other words, the transmitting unit, which transmits a data stream via the data connection, is provided with a data variation unit, which generates admissible deviation values, e.g. −2, −1, 0, 1, 2, in random order via a random generator and adds the deviation values to the discrete data values in the payload of the data stream. The imposition of small deviation values on the data values of the data stream prevents any steganographically disguised data, in particular malware or outbound confidential information, which may have been added to or superimposed on the data stream, from reaching the receiving unit undamaged. The contents of the added or superimposed or outbound data stream are disrupted by the deviation values, so that added data or steganographically camouflaged data superimposed on the data stream and outbound confidential information are rendered unusable.

According to the system described herein, any programs, such as web code, macros, Java scripts, etc., are executed on the isolation structure, not on the protected computer structure. The image data, audio signals and position data for pointers generated on the isolation structure are transferred to the computer structure via the data stream, whereby additional protection against superimposed data, in particular malware, is achieved by adding up deviation values.

In practice, the isolation structure can exchange data with an insecure data source via an interface, e.g. with the Internet, with a mail server or via a USB interface with external data storage devices such as USB sticks. Computers connected to the Internet are at risk of malware. The same applies to computers to which external data storage devices are connected via interfaces. The computer unit in the protected computer structure can execute all accesses to the Internet or to data sources connected via interfaces via the isolation structure and process the data retrieved from the Internet or the data sources on the isolation structure. The data retrieved from the Internet or from external devices is processed on the isolation structure and only the optical and acoustic output signals resulting from the processing are transmitted via the data connections to the computer in the protected computer structure, whereby the corresponding data stream is distorted by the superimposed deviation values.

In practice, the data stream can be transmitted as a sequence of data packets, each containing a header and a payload, whereby the header is used to determine the data values for which the addition of deviation values is permitted. As mentioned initially, the header contains information about the source and destination as well as information about the payload of a data packet. Data packets with inadmissible header information are deleted and not forwarded. For certain data streams, for example keyboard data, text data, addresses such as hyperlinks or control commands, discrete data values are transmitted identically in order to achieve the desired representations or functions. The data values are not changed because the transmission of different characters or functions would cause considerable interference or render the transmitted data values unusable. The same applies to the header itself. Other data types in the payload, on the other hand, are insensitive to minor deviation values. In the case of image data from a graphics card, for example, with data values that represent the pixels of a screen, small deviations are not or are hardly noticed by the viewer. The same applies to digital audio signals. Minor fluctuations and deviations from the data values actually transmitted are barely audible to the viewer and do not change the perceived audio signal. Finally, position data for a pointer is also insensitive to small fluctuations.

This means that the data values for which the addition of deviation values is permitted can represent one of the following contents:

image data;

digital audio signals;

position data for a pointer.

In principle, all data values should be varied by adding deviation values in order to effectively prevent any transfer of malware to the protected computers and any unauthorized leaking of data from the protected computers. Adding deviation values to the payload is only inadmissible if the smallest variations in the payload do not trigger the desired function or the content is distorted.

The addition of deviation values can be deactivated for certain data, such as for uploading or downloading data files or programs or for encrypted data. Encrypted data, files or programs would be rendered unusable by the addition of deviation values because the encrypted data, files or programs could no longer be decrypted back into the original data. For certain data streams, the addition of deviation values can therefore be deactivated, for example by the system administrator, who thus executes the decision of the person responsible for security of the computer structure, or a person authorized by the system administrator.

Data from the Internet or other insecure data sources is only forwarded indirectly (not directly) to the computer in the protected computer structure. Furthermore, the data stream can be transcoded before transmission via the data connection.

In other words, communication from the isolation structure to the computer in the protected computer structure can be largely limited to the transmission of sound data and image data in transcoded form. The application software can run on the isolation structure, which, for example, executes the websites accessed and the applications located on the websites. Any malware contained on the websites or other malware transmitted via the Internet connection is then intercepted and stopped in the isolation structure and does not reach the computers in the protected computer structure.

In this way, the display and sound playback of content accessed on the Internet can be transmitted to the protected computer and can be perceived by the user of the protected computer without the data stream from the Internet directly reaching the protected computer. Functional elements of the websites accessed on the Internet or software apps located on the Internet are not transmitted, but only the screen displays and sound signals generated by accessing the websites. Such information to be reproduced, which is viewed or heard by the user, is also distorted in meaningfulness by incrementally small changes due to the superimposed deviation values in a non-disturbing manner. Small deviations in the brightness or color tone of an image are compensated for by the human eye and do not interfere with the visual perception of the displayed information. The same applies to incremental variations in the pitch or volume of sound data.

User input such as keyboard input, mouse position data and mouse control commands, click information from mouse clicks and other information such as Internet addresses (URLs or IP addresses) are in turn transmitted to the isolation structure from the protected computer structure. In this way, the user of the computer in the protected computer structure remotely controls the software running on the isolation structure (e.g. Internet browser, e-mail or video conference). The data values for which the addition of deviation values is admissible may also be identified in the data packets transmitted to the isolation structure by analyzing the header data. This is the case, for example, with position information for pointers. Control commands such as keystrokes, network addresses or URLs or string variables (character strings) in general, on the other hand, are not changed so as not to impair functionality.

Any data added to or superimposed on the data stream between the isolation structure and the protected computer, for example malware intended to damage the protected computer, or confidential data on the protected computer that is superimposed on the data stream steganographically, is damaged and rendered unusable by the data variation unit generating deviation values via a random generator and imprinting the deviation values on the transmitted data values.

The value range within which the deviation values are generated by the data variation unit via a random generator can be selected depending on the data type. For example, larger deviation values can be applied to video signals without perceptibly distorting the overall impression of the video signal for the user. In the case of position data for a pointer, the deviations can be kept small so as not to jeopardize the functionality of the system.

However, small deviation values that result in a slight jittering of the displayed pointer, for example, are admissible without jeopardizing the functionality.

In practice, the pixel data of the individual images (frames) stored in the frame buffer of the graphics card can be transmitted via the data connection. The image data values assigned to the individual pixels can be distorted within certain limits, e.g. between −2 and +2, without significantly distorting the image visible to the viewer. The same applies to the sound data that the isolation structure generates from the data retrieved from the insecure source, e.g., the Internet. Instead of forwarding the data stream received from the Internet, the sound data transcoded by the sound card is forwarded to the protected computer structure, whereby minimal variations in the transmitted data values do not cause any audible deviations.

Content accessed via the Internet is usually provided on websites. Websites usually consist of structured text in which images and other multimedia elements can be integrated. Websites can have static (fixed) or dynamic content. Dynamic content is generated anew each time the dynamic content is accessed, sometimes based on the result of a database query. As mentioned above, the functional elements of the website are processed in the isolation structure alone and are not transferred to the protected computers.

Transcoding the data received from the Internet already significantly reduces the risk of malware being transferred to the protected computer. The additional distortion of the data stream of the transcoded data with small deviation values can reliably prevent the isolation structure from being infected with malware in any way.

In the other direction, i.e., from the protected computer of the computer structure to the isolation structure, position data for a pointer, e.g., data streams from a computer mouse or a touch pad or a touch screen, can be distorted by superpositions. Minimal shifts of the pointer by one or two pixels generally have no negative effects on the function of the pointer. On the other hand, the distortion of the data stream does not prevent the unwanted transmission of data that is superimposed or added to the data stream to the Internet, but the distortion of the data stream destroys the unintentionally leaked data or makes the unintentionally leaked data unusable for the recipient.

If the protected computer is a smartphone, for example, image data or sound data can also be transmitted to the isolation structure via the data connections. Image data or sound data is transmitted to the isolation structure, for example, when recordings made via the camera and microphone of the smartphone are transmitted through the data stream to the isolation structure and from here to the Internet, e.g., during a video call.

In practice, any data streams in which a slight variance does not impair functionality can be distorted by applying deviation values, whereby data superimposed or added to the data streams becomes ineffective or unusable.

The protected computer structure can be a computer network that connects one or more of the following computer units for data exchange:

- physical servers;
- virtual servers;
- Cloud interfaces; (usually with unknown structures behind the cloud interfaces);
- PCs;
- Laptops;
- Tablet computer;
- Smartphones;
- Processors of smart objects.

The isolation structure, which is connected to the Internet and protects the computer structure, can be a computer or other data processing device with a powerful CPU and the necessary interfaces, or a virtualized computer or server.

Furthermore, a protocol filter can check the permissibility of the communication protocol for the transmission of the data stream between the isolation structure and the computer structure. Using the protocol filter ensures that only the admissible data streams, which have been modified as far as possible, are transmitted via the data connections between the computer structure and the isolation structure. The unintended transmission of other data streams, such as malware data or the unauthorized retrieval of confidential data, is blocked by the protocol filter.

The method described herein can be implemented in practice by a computer program product for running on a processor. In particular, the computer program product can run on one of the following processors:

- a processor of the insulation structure;
- a processor of a separate unit for generating and imprinting the deviation values;
- a processor of a computer.

In other words, the isolation computer connected to the Internet may have a software routine that selectively imposes deviation values on data streams before the data streams are transmitted to the computer structure. A computer unit in the computer structure can also have a software app that adds up the deviation values. Preferably, however, a separate unit is provided between the insulation structure and the computer structure, which is set up to generate and add the deviation values. The unit is preferably hard-wired and cannot be reprogrammed or can only be reprogrammed to a limited extent to ensure that malware does not affect the component that distorts the data streams.

Finally, the system described herein is realized by a system that includes a data variation unit of the type described above.

Further advantages are described below in connection with the drawing.

BRIEF DESCRIPTION OF DRAWINGS

The sole FIGURE shows a schematic representation of a protected computer structure and an isolation structure that shields the computer structure from insecure data sources.

DETAILED DESCRIPTION OF VARIOUS EMBODIMENTS

The sole FIGURE schematically shows a computer structure 1, which is to be protected against the unwanted transmission of data such as malware from insecure data sources. The computer structure 1 is also intended to prevent unauthorized data streams from being retrieved from the computer structure 1 or being sent by malware that is already present in the computer structure 1.

The computer structure 1 may be a company network, in particular an intranet, which may be configured to access a local data storage device 2 but also external data sources 10 and the Internet 9. In the example shown in the sole FIGURE, the computer structure 1 has both a local network 3 (Local Area Network LAN) and a wireless network 4 (e.g. WLAN or WiFi). Mobile IT devices (computer units) such as a smartphone 5 and a tablet computer 6, are integrated into the computer structure 1 via the wireless network 4. The local data storage device 2 and a personal computer 7 (in this case a laptop) are integrated into the computer structure 1 via the local network 3. Computer structure 1 is also assigned a server 8, which controls communication and can provide software and storage space for the integrated computer units 5, 6, 7.

It should be noted that the various IT devices and connections of the IT devices to the computer structure 1 are only shown as examples. Of course, mobile devices can also be connected to the local network 3 via docking stations, for example, or PCs can be connected to the wireless network via a WLAN interface. The computer structure 1 is not limited to the illustrated embodiment with a physical server 8. The server 8 can also be an emulated server. The illustrated components of the computer structure 1 can of course be present more than once. Finally, further digital devices can be included in the computer structure 1, for example sensors of so-called smart objects, i.e., automatically functioning objects that have data processing capacities and communication interfaces. The protected computer structure 1 can be of any complexity. Components can also be integrated via a virtual private communication network VPN. However, the protected computer structure 1 can also have a simpler design. In the simplest case, the computer structure 1 is a stand-alone computer or a smartphone.

To protect the computer structure 1, the computer structure 1 is not directly connected to the Internet 9 or insecure data sources 10. An isolation structure 11 is available for access to the Internet 9 or other insecure data sources, such as a USB stick 10. The isolation structure 11 has a CPU 12 and a local data storage device 13. In addition, the isolation structure 11 can have a graphics card 14, a sound card 15 and a data interface 16, in particular a USB interface, Ethernet interface, WLAN interface or other communication interface. The data interface 16 can also have multiple individual interfaces that can be used to exchange data with different data sources. A data connection 18 enables bidirectional data communication between the isolation structure 11 and the computer structure 1.

The isolation structure 11 therefore has all data processing devices and peripheral devices as well as interfaces that are required for retrieving and processing data and software apps from insecure data sources 10 and from the Internet 9. The data and the software apps retrieved from the Internet 9 and from other insecure data sources 10 run on the isolation structure 11 or are stored in the isolation structure 11. The result of the data processing, e.g., the executed software apps, is forwarded to the computer unit (smartphone 5, tablet computer 6, PC 7) of the protected computer structure 1 via the data connection. As far as possible, only sound data and image data generated by the isolation structure 11 are forwarded to the computer units 5, 6, 7 and reproduced by the computer units 5, 6, 7.

The data values that are transmitted to the computer structure 1 are, as far as possible, distorted by a data variation unit 19. The data variation unit 19, which contains a random number generator 17, is shown schematically in the sole FIGURE as a separate hardware component. The illustrated embodiment offers a high level of security. The data variation unit 19 is a separate hardware component with CPU and main memory, on which a program that is permanently programmed or can only be changed with a great deal of technical effort runs, which analyzes the incoming and outgoing data streams and—as far as possible-distorts the incoming and outgoing data streams. The header of the received data packets is used to determine whether the data values of the payload can be altered without becoming unusable. Altering data is possible, for example, with image data, sound data and to a certain extent with position data from pointers such as mouse pointers. If the suitability of certain data packets for such distortion is determined, the data variation unit 19 generates deviation values within admissible limits (e.g. between −2 and +2) via a random generator 17. The admissible limits can vary for different types of data (sound data; image data; position data). The generation of non-negative deviation values (e.g., 0, 1 and 2) which are then added or subtracted—also according to a random determination—is equivalent to the solution described herein of generating and adding up positive and negative deviation values.

By ensuring that no data originating from the Internet 9 or other insecure data structures 10 is stored on the computers (smartphone 5, tablet computer 6, PC 7) of the protected computer structure 1 and that no software retrieved from the Internet 9 or other insecure data structures 10 is executed, the computers 5, 6, 7 of the protected computer structure 1 are protected against malware. The additional imprinting of deviation values prevents steganographically disguised data added to or superimposed on the data streams from damaging the computers 5, 6, 7 of the protected computer structure 1.

The data stream in the other direction, i.e., from the computers 5, 6, 7 of the protected computer structure 1 to the isolation structure 11, is also routed via the data variation unit 19. This data stream transmits data of the user of the computers 5, 6, 7 to the outside, i.e., to the Internet 9 or to the insecure data source 10. Furthermore, the data stream is used to remotely control the user programs executed in the isolation structure 11. The users of the computers 5, 6, 7 see on the displays the images generated by the Internet access of the isolation structure 11 and by the software running on the isolation structure 11. Input devices such as keyboards, mice, touch pads or touch screens connected to the computers 5, 6, 7 are used to generate the control commands and data streams that are transmitted to the isolation structure 11. In principle, all data streams are modified by the data variation unit 19 by applying deviation values. This applies in particular to image and sound data, position data from pointers and data streams that are sent to the outside by malware that may already be present in the computer structure 1 in order to allow confidential company information to be leaked unnoticed. The company information that may be leaked unnoticed by malware is destroyed or rendered unusable by the imprinting of deviation values.

Data values that are sensitive to slight variations, i.e., that do not trigger the desired function or obtain meaningless content in case of smallest variations, are passed through the data variation unit 19 unchanged. The same applies to encrypted data. The system administrator of the protected computer structure 1 can set which data types or for data from which data source(s) the imprinting of deviation is deactivated.

As mentioned above, the data variation unit 19 can be designed as a separate hardware component that has a dedicated CPU and data storage device for storing the executed software and any other data that may be generated. In particular, the data variation unit 19 can be designed to be unchangeable or only changeable with great technical effort. Protection against changing the configuration of the data variation unit 19 and IT components of the data variation unit 19 prevents unauthorized persons from deactivating or impairing the security function provided by the data variation unit 19.

In practice, however, it is also possible to emulate the data variation unit 19 as a software module that runs on the CPU 12 of the isolation structure 11. The software module can also have components that run on the server 8 of the protected computer structure 1 or on the end devices (smartphone 5, tablet 6, PC 7) of the protected computer structure 1.

The features of the invention disclosed in the present description, in the drawings and in the claims may be essential, both individually and in any combination, for the realization of the invention in its various embodiments. The invention is not limited to the described embodiments. It can be varied within the scope of the claims and taking into account the knowledge of the person skilled in the art.

The invention claimed is:

1. A method for protecting a computer structure having at least one computer unit against malware or unauthorized data transmission from a potentially insecure data source, comprising:

an isolation structure having at least one processor and a main memory receiving data from the potentially insecure data source;

connecting the computer structure via a data link to at least one data variation unit that is separate from and connected to the isolation structure; p1 the isolation structure executing application software provided by the potentially insecure data source to provide to the at least one data variation unit at least one data stream which contains a sequence of data values, wherein at least some of the sequence of data values corresponds to output signals from the isolation structure executing application software and includes at least one of: sound data, image data, and mouse pointer data;

the at least one data variation unit generating deviation values using a random generator; and the at least one data variation unit selectively adding the deviation values to data values of the at least one data stream to provide at least one distorted data stream to or from the computer structure.

2. The method according to claim 1, wherein the data values additionally represent outbound data streams which are sent by malware present in the computer structure.

3. The method according to claim 1, wherein the potentially insecure data source is the Internet.

4. The method according to claim 1, wherein the data stream is transmitted as a sequence of data packets which have a header and a payload, the header being used to determine ones of the data values for which addition of the deviation values is admissible.

5. The method according to claim 4, wherein the addition of the deviation values to the payload is inadmissible if the content is distorted or a desired function is not triggered in in response to any variations in the payload.

6. The method according to claim 1, wherein addition of the deviation values is deactivated for certain data streams.

7. The method according to claim 6, wherein the certain data streams include data files or programs or encrypted data.

8. The method according to claim 1, wherein the at least one data stream is transcoded before transmission to the computer structure via the data link.

9. The method according to claim 1, wherein the computer structure is a network which interconnects one or more of the following computer units for data exchange: physical servers; virtual servers; cloud interfaces; PCs;
laptops; tablet computers; smartphones; and/or processors of smart objects.

10. The method according to claim 1, wherein the isolation structure is at least one of the following: a computer, any other data processing device having a powerful CPU and necessary interfaces, a virtualized computer, a virtualized server.

11. The method according to claim 1, wherein a protocol filter checks admissibility of the communication protocol for transmission of the at least one data stream between the isolation structure and the computer structure.

12. A non-transitory computer readable medium containing software that protects a computer structure having at least one computer unit against malware or unauthorized data transmission from a potentially insecure data source, the computer structure being connected via a data link to at least one data variation unit that is separate from and connected to an isolation structure having at least one processor and a main memory that receives data from the potentially insecure data source, the software comprising:
executable code that causes the isolation structure to send or receive at least one data stream to or from the at least one data variation unit, the data stream containing a sequence of data values, wherein the sequence of data values correspond to output signals from the isolation structure executing application software provided by the potentially insecure data source and include at least one of sound data, image data, and mouse pointer data; and
executable code that causes the at least one data variation unit to generate and add deviation values to data values of the at least one data stream to provide at least one distorted data stream that is exchanged between the computer structure and the at least one data variation unit.

13. The non-transitory computer readable medium according to claim 12, further comprising:
executable code that deactivates addition of deviation values to a payload of the data stream if a content type of the payload is distorted or a desired function is not triggered in in response to any variations in the payload.

14. The non-transitory computer readable medium according to claim 12, further comprising:
executable code that transcodes the data stream before transmission to the computer structure via the data link.

15. The non-transitory computer readable medium according to claim 12, wherein the executable code is executed on at least one of the following processors: a processor of the isolation structure; a processor of a data variation unit, which is provided as a separate hardware component for generating and imprinting the deviation values; and/or a processor of the computer unit.

16. The non-transitory computer readable medium according to claim 12, wherein the potentially insecure data source is the Internet.

17. A system that protects a computer structure which has at least one computer unit against malware or unauthorized data transmission from a potentially insecure data source, comprising:
an isolation structure that receives data from the potentially insecure data source and having at least one processor and a main memory, the isolation structure generating at least one data stream, which contains a sequence of data values, wherein the sequence of data values correspond to output signals from the isolation structure executing application software provided by the potentially insecure data source and include at least one of sound data, image data, and mouse pointer data; and
at least one data variation unit, separate from the isolation structure and connected between the computer structure and the isolation structure, which generates deviation values using a random generator and adds the deviation values to the data values of the at least one data stream to provide at least one distorted data stream that is sent to and received from the computer structure.

18. The system according to claim 17, wherein the data variation unit is a separate hardware component.

19. The system according to claim 17, wherein the data variation unit is a software component which is executed on a processor of at least one computer unit or a server within the computer structure.

20. The system according to claim 17, wherein the potentially insecure data source is the Internet.

* * * * *